(No Model.)
T. A. EDISON.
MANUFACTURE OF FILAMENTS FOR INCANDESCENT ELECTRIC LAMPS.
No. 446,669. Patented Feb. 17, 1891.
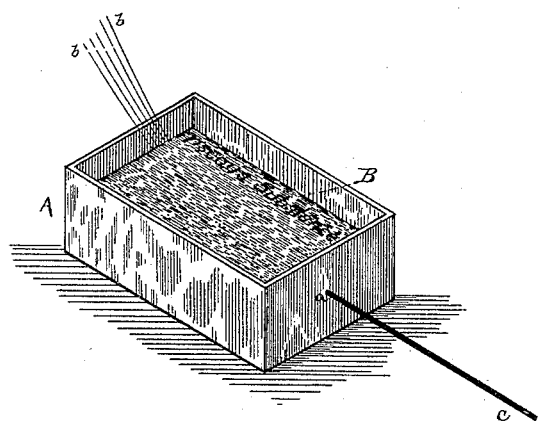
ATTEST:
E. C. Rowlands
H. W. Seely
INVENTOR:
Thomas A. Edison
By Rich'd N. Dyer,
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MANUFACTURE OF FILAMENTS FOR INCANDESCENT ELECTRIC LAMPS.

SPECIFICATION forming part of Letters Patent No. 446,669, dated February 17, 1891.

Application filed March 16, 1883. Serial No. 88,359. (No model.)

*To all whom it may concern:*

Be it known that I, THOMAS A. EDISON, of Menlo Park, in the county of Middlesex and State of New Jersey, have invented a new and useful Improvement in Incandescing Conductors for Electric Lamps, (Case No. 548,) of which the following is a specification.

The object of this invention is to produce a flexible carbon filament for the incandescing conductor of an electric lamp formed of a number of filaments massed together, the resulting filament being even in size and mass and integral throughout its entire length. I accomplish this by covering the massed filaments with a viscous carbonizable gum, such as tragacanth or bassorin, which welds them all closely together into an integral mass. The whole is carbonized under strain or pressure, and is bent either before or after carbonization into the shape desired for the incandescing conductor. The coating of the filaments with the viscous gum is preferably done by drawing them together through a mass of such substance, which will adhere to them at every part. This method of preparing the filaments is illustrated in the annexed drawing.

A is a suitable receptacle containing the viscous carbonizable gum B in a soft condition. The receptacle is open at its top, and one of its sides is provided with a small hole $a$. A number of fine filaments $b\ b$, preferably manilla or similar natural fibers, are taken and their ends passed through the hole $a$ from within the box, as shown. The filaments are then drawn through the viscous gum and out at the hole, being completely covered by the viscous substance and welded together into the compact integral carbonizable filament $c$ during the passage. The aperture $a$ is so formed as to give the desired shape and size to the filament. This filament is carbonized in a suitable manner.

In my application No. 210 (Serial No. 5,864) I have described the welding together of a number of natural fibers by dipping them into a solution of sugar or other carbonizable liquid and then carbonizing as one fiber to form the carbon filament of my incandescent electric lamp. The present invention is an improvement upon that described in my prior application.

What I claim is—

1. A filament for forming the flexible carbon incandescing conductor of an electric lamp, having a number of fine filaments welded together by a binding agent consisting of a viscous carbonizable gum, substantially as set forth.

2. The method of manufacturing incandescing conductors for electric lamps, consisting in uniting by a binding agent consisting of a viscous carbonizing gum a number of carbonizable filaments, and then carbonizing the whole, substantially as set forth.

3. The method of manufacturing incandescing conductors for electric lamps, which consists in massing a number of carbonizable filaments together, then drawing them simultaneously through a binding agent consisting of a viscous carbonizable substance and a forming-die, and then carbonizing them, substantially as set forth.

This specification signed and witnessed this 17th day of February, 1883.

THOS. A. EDISON.

Witnesses:
 WM. H. MEADOWCROFT,
 H. W. SEELY.